United States Patent
Lin (10) Patent No.: US 10,264,088 B1
(45) Date of Patent: Apr. 16, 2019

(54) LAMP CAPABLE OF PUSHING INFORMATION, ELECTRONIC DEVICE AND PASSING INFORMATION PUSHING SYSTEM

(71) Applicant: Lite-On Technology Corporation, Taipei (TW)

(72) Inventor: Chang-Yi Lin, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 15/844,657

(22) Filed: Dec. 18, 2017

(30) Foreign Application Priority Data

Sep. 29, 2017 (TW) .............................. 106133784 A (51) Int. Cl.
| | | |
|---|---|---|
| *G08G 1/095* | (2006.01) | |
| *H04L 29/08* | (2006.01) | |
| *G08G 1/005* | (2006.01) | |
| *G08G 1/09* | (2006.01) | |
| *G08G 1/00* | (2006.01) | |
| *G08G 1/096* | (2006.01) | |

(52) U.S. Cl.
CPC .............. *H04L 67/26* (2013.01); *G08G 1/00* (2013.01); *G08G 1/005* (2013.01); *G08G 1/091* (2013.01); *G08G 1/095* (2013.01); *G08G 1/096* (2013.01)

(58) Field of Classification Search
CPC .......... G08G 1/00; G08G 1/005; G08G 1/091; G08G 1/095; G08G 1/096
See application file for complete search history.

(56) References Cited

U.S. PATENT DOCUMENTS

| | | | | |
|---|---|---|---|---|
| 4,025,922 A | * | 5/1977 | Trawick, III | A61H 3/061 340/407.1 |
| 6,833,796 B2 | * | 12/2004 | Bourgault | G08G 1/096 340/925 |
| 8,694,192 B2 | * | 4/2014 | Cullinane | G05D 1/00 701/23 |
| 9,293,043 B2 | * | 3/2016 | Yamada | G08G 1/096716 |
| 2005/0237224 A1 | * | 10/2005 | Gotfried | G01C 21/3697 340/929 |
| 2008/0272936 A1 | * | 11/2008 | Kim | G08G 1/095 340/929 |
| 2015/0262483 A1 | * | 9/2015 | Sugawara | G08G 1/0962 340/929 |
| 2016/0093207 A1 | * | 3/2016 | Di Censo | H04R 1/1091 340/944 |
| 2016/0155327 A1 | * | 6/2016 | Schlienz | H04W 4/046 340/907 |

\* cited by examiner

Primary Examiner — Andrew W Bee
(74) Attorney, Agent, or Firm — JCIPRNET (57) ABSTRACT

A passing information pushing system is provided. The system includes a plurality of lamps, and an electronic device. Each of the lamps continuously identifies a signal type of power, calculates a remaining duration corresponding to the current signal type, and pushes a passing state and the remaining duration corresponding to the current signal type. The electronic device receives a first information from a first lamp, and identifies a first lamp direction. The electronic device receives a second information from a second lamp, and identifies a second lamp direction. Furthermore, the electronic device notifies a corresponding passing state and remaining duration according to the first information or the second information by determining whether a current moving direction is parallel to the first lamp direction or the second lamp direction.

11 Claims, 5 Drawing Sheets

LAMP CAPABLE OF PUSHING INFORMATION, ELECTRONIC DEVICE AND PASSING INFORMATION PUSHING SYSTEM

CROSS REFERENCE TO RELATED APPLICATION

This application claims the priority benefit of Taiwan application serial no. 106133784, filed on Sep. 29, 2017. The entirety of the above-mentioned patent application is hereby incorporated by reference herein and made a part of specification.

BACKGROUND OF THE INVENTION

1. Field of the Invention

The present invention relates to a passing information pushing system, and more particularly, to a passing information pushing system which is suitable for pushing information from a lamp capable of pushing information to an electronic device and performing corresponding notifying operation on the electronic device.

2. Description of Related Art

In general, current pedestrian signal indicates, in a manner of lighting signals, whether the passage corresponding to the pedestrian signal is allowable for pedestrian to pass through. Even there is already an audible indicator correspondingly disposed on the pedestrian signal for the deaf, the audible indicator cannot effectively indicate the currently remaining allowable-passing time or the current remaining forbidden-passing time. On the other hand, due to the popularization of smart mobile devices (smart portable devices), pedestrians using smart mobile devices are less likely to notice the approaching intersection traffic status while watching the device screens.

SUMMARY OF THE INVENTION

The present invention provides a lamp capable of pushing information, an electronic device, and a passing information pushing system, capable of making a traffic signal (traffic light), a pedestrian signal or a lamp having similar function can proactively transmit information about whether its corresponding passage is allowable for passing through to nearby electronic devices, and making the electronic devices to make a clear notification to inform, according to the received information, whether the passage corresponding to the lamp is allowable or forbidden for passing through.

An embodiment of the present invention provides a lamp capable of pushing information. The lamp includes a power management circuit, a light-emitting module, a wireless communication module, and a processor. The power management circuit is configured to receive a power and identify a signal type of the power. The light-emitting module is configured to emit light or flash according to the received power. The processor is coupled to the light-emitting module, the power management module and the wireless communication module, wherein the processor is configured to treat the current identified signal type of the power as a current signal type, and start to continuously accumulate a duration corresponding to the current signal type. Furthermore, the processor is further configured to determine whether the current signal type is changed, wherein when the current signal type is changed, the processor is further configured to stop accumulating the duration, and record the accumulated duration as a total duration corresponding to the current signal type, wherein when the current signal type is not changed, the processor is further configured to calculate, according to the total duration and currently accumulated duration, a remaining duration corresponding to the current signal type. Moreover, the processor is further configured to instruct the wireless communication module to push the information corresponding to the current signal type, wherein the information comprises a passing state and the remaining duration corresponding to the current signal type.

An embodiment of the present invention provides an electronic device. The electronic device includes a global positioning device, a wireless communication module, and a processor. The global positioning device is configured to detect a position information of the electronic device. The wireless communication module is configured to receive information being pushed. The processor is coupled to the global positioning device and the wireless communication module, wherein the processor is configured to continuously determine a moving direction of the electronic device via the position information of the electronic device. Furthermore, the processor receives first information pushed by a first lamp through the wireless communication module, and identifies a first lamp direction. Moreover, the processor receives second information pushed by a second lamp through the wireless communication module, and identifies a second lamp direction. The process is further configured to determine whether the electronic device is continuously moving, wherein when the electronic device is continuously moving, the processor determines whether the current moving direction is parallel to the first lamp direction or the second lamp direction, wherein when the current moving direction is parallel to the first lamp direction, the processor performs a notifying operation according to the first information corresponding to the first lamp, wherein when the current moving direction is parallel to the second lamp direction, the processor performs a notifying operation according to the second information corresponding to the second lamp.

An embodiment of the present invention provides a passing information pushing system. The system includes a plurality of lamps and an electronic device. Each of the lamps emits light according to received power, so as to indicate whether corresponding passage is allowable for passing through via the emitted light therefrom. Furthermore, wherein each of the lamps identifies a signal type of the power, wherein when the signal type of the power is a first type or a third type, light emitted by each of the lamps receiving the power is for indicating that the corresponding passage is allowable for passing through, wherein when the signal type of the power is a second type, light emitted by each of the lamps receiving the power is for indicating that the corresponding passage is forbidden for passing through. Each of the lamps treats the currently identified signal type of the power as a current signal type, and starts to continuously accumulate a duration corresponding to the current signal type, and each of the lamps calculates, according to a total duration and currently accumulated duration corresponding to the current signal type, a remaining duration corresponding to the current signal type. Moreover, each of the lamps is further configured to push information corresponding to the current signal type, wherein the information comprises a passing state and the remaining duration corresponding to the current signal type, wherein the electronic device continuously determines a current moving direction of the electronic device, wherein the electronic device receives a first information pushed by a first lamp among the lamps, and identifies a first lamp direction, wherein the electronic device receives a second information pushed by a second lamp among the lamps, and identifies a second lamp direction. Then, the electronic device performs a notifying operation according to the first information corresponding to the first lamp or the second information corresponding to the second lamp by determining whether the current moving direction is parallel to the first lamp direction or the second lamp direction, so as to indicate the passing state and the remaining duration corresponding to the first lamp or the second lamp.

Based on the above, lamp, electronic device and passing information pushing system provided by the embodiment of the present invention, are capable of letting the traffic lights or lamps having similar function determines passing state of corresponding passage by using signal type of the current received power, and obtaining total durations and remaining durations respectively corresponding to different passing states, and then proactively pushing information including the passing states and corresponding remaining durations of the corresponding passage to nearby electronic devices, such that an electronic devices received the pushed information may perform, based on determining whether current moving direction of the electronic device is parallel to lamp direction corresponding to the received information, a notifying operation to indicate current passing state and remaining duration corresponding to the passing state for a passage through which the electronic device is about to pass.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
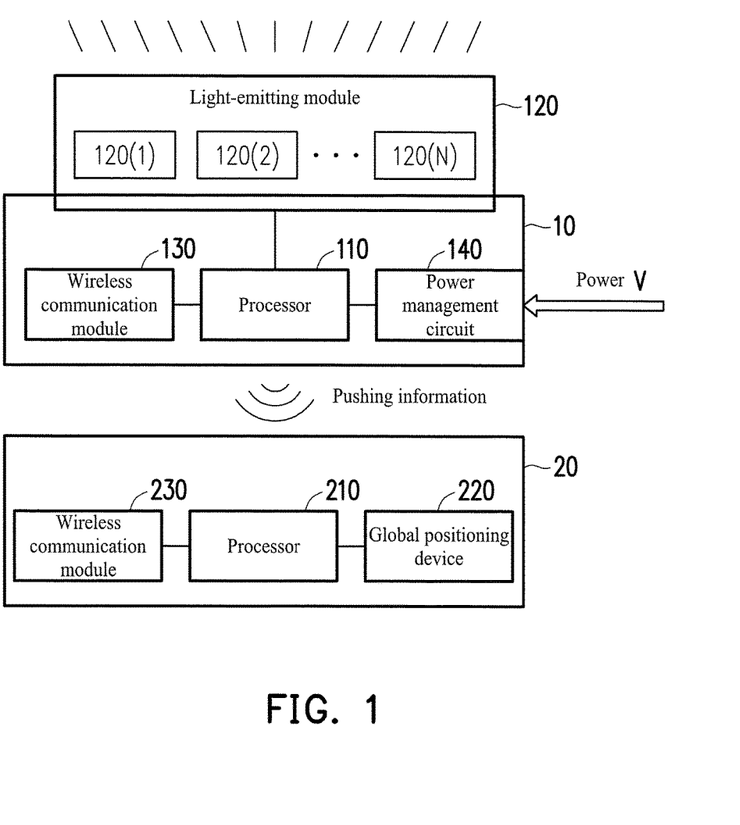
FIG. 1 is a block diagram illustrating a passing information pushing system according to an embodiment of the invention.

FIG. 1 is a block diagram illustrating a passing information pushing system according to an embodiment of the invention. Referring to FIG. 1, a passing information pushing system includes lamp 10 and electronic device 20. In the embodiment, the passing information pushing system enables the lamp 10 to proactively push lamp information to nearby electronic device 20, and the electronic device 20 may perform corresponding notifying operation based on the received information. The lamp 10 includes a processor 110, a light-emitting module, a wireless communication module 130 and a power management circuit 140. The electronic device 20 includes a processor 210, a global positioning device 220 and a wireless communication module 230. In the embodiment, the processor 210 is coupled to the global positioning device 220 and the wireless communication module 230.

In the embodiment, the lamp 10 may be any type of lamp or lighting equipment which is for indicating whether a corresponding passage is allowable for passing through. The lamp 10 may indicate a passing state of the corresponding passage as an allowable-passing state, a forbidden-passing state or a waring state via a light emitted by the light-emitting module 120. The allowable-passing state presents that the passage corresponding to the lamp is allowable for passing through; the forbidden-passing state presents that the passage corresponding to the lamp is forbidden (not allowable) for passing through; the warning state presents that current passing state of the passage corresponding to the lamp is about to be changed. Furthermore, the lamp 10 may further indicate remaining duration of the allowable-passing state, the forbidden-passing state, or the waring state via a light emitted by the light-emitting module 120, and the remaining duration would be counted down continuously. For example, a pedestrian or a driver of a vehicle may know that a passage corresponding to the lamp is allowable for passing through and the remaining time (e.g., remaining seconds) for passing through via light emitted by the lamp. It should be mentioned that, for purpose of cost down (and saving the construction/maintaining cost of connection), in the embodiment, the lamp 10 does not need to connect to a central control system (or a server) for knowing the current passing state and corresponding remaining duration of the passage corresponding to the lamp 10 via control signal or command sent from the central control system.

The light-emitting module 120 includes a plurality of light-emitting element 120(1) to 120(N). N is a positive integer. The light-emitting elements, for example, are light-emitting diodes (LED), energy-saving light bulbs, fluorescent tubes and other luminous electronic components, and lights emitted by different light-emitting elements 120(1) to 120(N) can be different. In the embodiment, it may, according to light-emitting state of the light-emitting elements 120(1) to 120(N), indicate current passing state of a passage corresponding to the lamp 10 is the allowable-passing state, the forbidden-passing state, or the warning state, and indicate remaining duration of current passing state.

The power management circuit 140 is configured to receive a power V provided by an external power source (such as city electricity), and the power V is supplied to the light-emitting module 120 via different channels (power channels) of the power management circuit 140 for light-emitting elements 120 (1) to 120 (N) to emit light. The power management circuit 140 may inform the processor 110 that the current channel for receiving the power V, that is, transmit the information about the channel receiving the power V to the processor 110.

The wireless communication module 130, 230 is configured to transmit or receive data in a manner of wireless communication. The wireless communication module 130 or 230 is, for example, one or a combination of circuits/ chipsets supporting Global System for Mobile Communication (GSM) system, Personal Handy-phone System (PHS), Code Division Multiple Access (CDMA) system, Wireless Fidelity (WiFi) system, Worldwide Interoperability for Microwave Access (WiMAX) system, 3G, Long Term Evolution (LTE), Infrared (Infrared) transmission, Bluetooth (BT) communication technologies, and is not limited thereto. In the embodiment, the wireless communication module 130 supports and utilizes Bluetooth 4.0 (BLE, Beacon, or iBeacon) Protocol to push information, and the wireless communication module 230 supports and utilizes Bluetooth 4.0 (BLE, Beacon, or iBeacon) Protocol to receive pushed information. It should be noted that the wireless communication module 130 and the wireless communication module 230 do not need to be paired with each other. When the wireless communication module 130 pushes the information, the wireless communication module 230 may automatically receive the information pushed by the wireless communication module 130.

In an embodiment, the wireless communication module 130 and/or the power management module 140 may also be integrated with the processor 110 as a lamp controller.

The processors 110 and 210 are hardware capable of computing, and are used to control the overall operation of the lamp 10 and the electronic device 20, respectively. Specifically, the processor 110 and 210 has a plurality of control instructions, and when the lamp 10 and the electronic device 20 is in operation, the control instructions are executed to perform the management operation of the corresponding lamp 10 and the electronic device 20. In this embodiment, the processors 110 and 210 are, for example, a Central Processing Unit (CPU), a micro-processor, or other programmable processing units, the Digital Signal Processor (DSP), a programmable controller, an Application Specific Integrated Circuits (ASIC), a Programmable Logic Device (PLD) or other similar circuit elements, and the present invention is not limited thereto.

The Global positioning device 220 may send and receive signals from the Global Positioning System (GPS) to detect (identify) a location information of the electronic device 20 (e.g., global 2D coordinate values). Through the location information of the electronic device 20 obtained by continuously detecting, the processor 210 may determine whether the electronic device 20 moves continuously and identify a moving direction corresponding to the electronic device 20 (the direction of movement of the electronic device 20). In another embodiment, the electronic device 20 may also identify relative moving direction between the electronic device 20 and different lamps 10 by identifying signal strengths of the wireless communication connections established with the wireless communication module 130 and the different lamps 10 (e.g., signal strength of Beacon or iBeacon).

Figure 2:
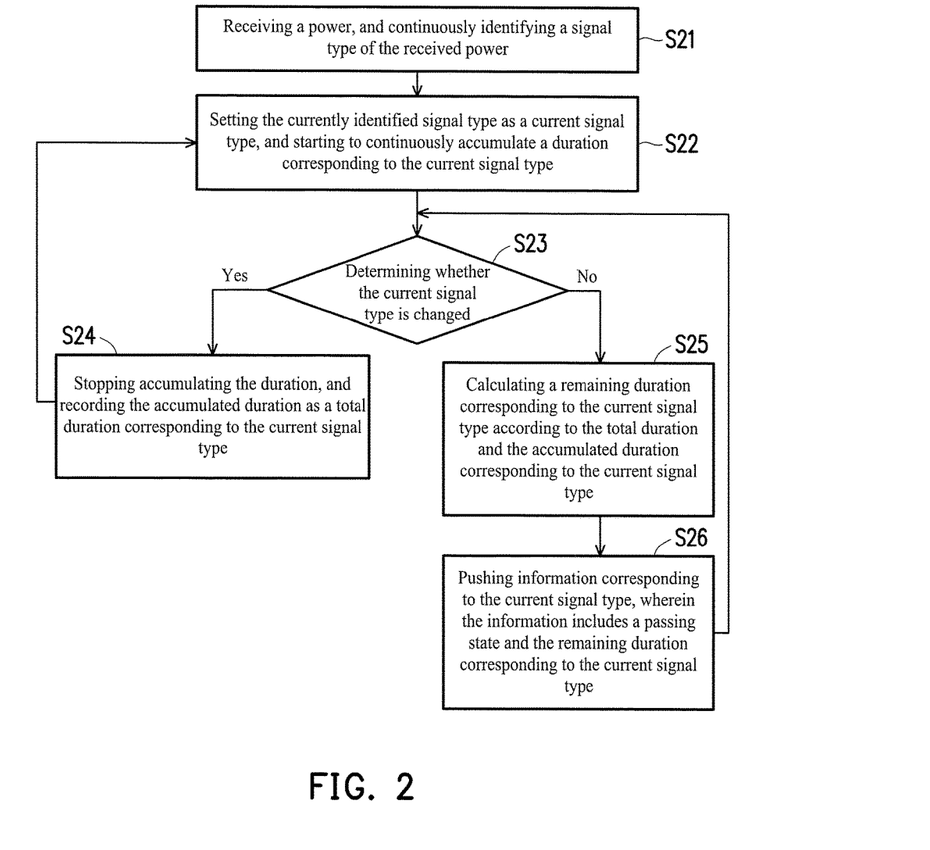
FIG. 2 is a flowchart illustrating an operation of a lamp pushing information according to an embodiment of the invention.

FIG. 2 is a flowchart illustrating an operation of a lamp pushing information according to an embodiment of the invention. Referring to FIG. 2, in the step S21, the power management circuit 140 receives a power V, and continuously identifies a signal type of the received power V. The details will be described below with reference to FIG. 3.

Figure 3:
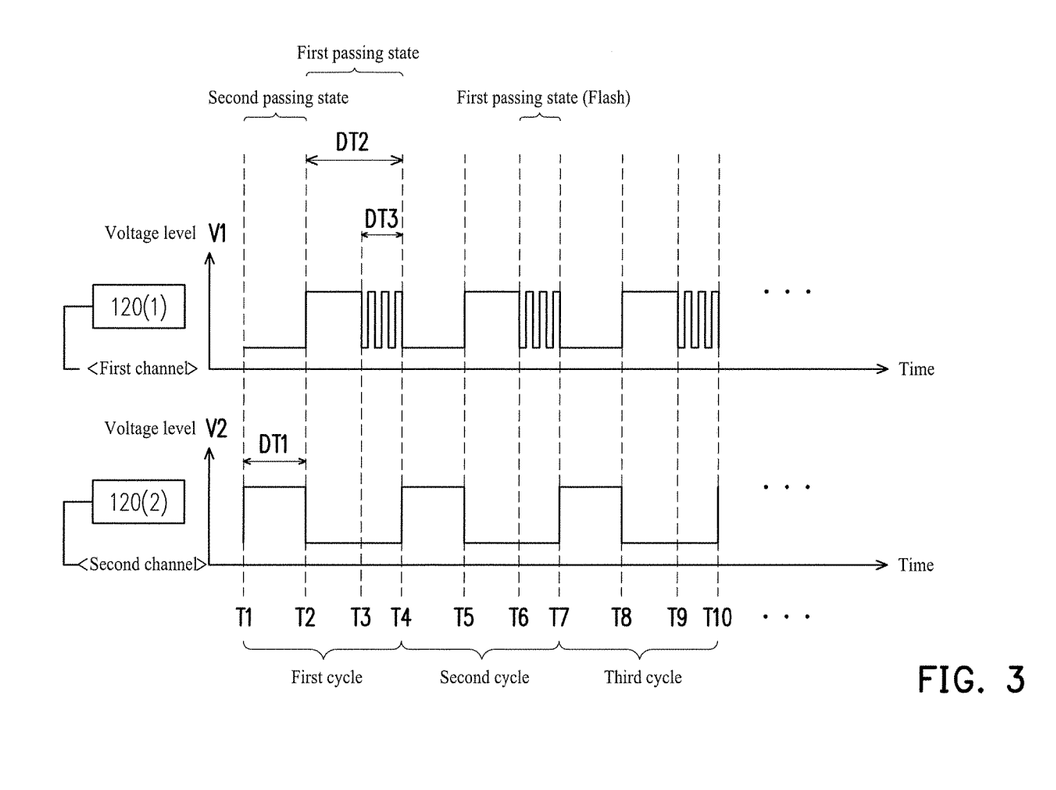
FIG. 3 is a schematic diagram illustrating signal types of power and corresponding passing states according to an embodiment of the invention.

FIG. 3 is a schematic diagram illustrating signal types of power and corresponding passing states according to an embodiment of the invention. Referring to FIG. 3, for example, the power management circuit 140 provides the power V via one (supplying channel) of a plurality of channels respectively corresponding to the plurality of light-emitting elements 120(1) to 120(N) of the light-emitting module 120. The power management circuit 140 may determine a signal type and a supplying channel of the power V. The signal type includes a first type and a third type corresponding to a first light-emitting element 120(1), and a second type corresponding to a second light-emitting element 120(2). The channels include a first channel corresponding to the first light-emitting element 120(1) and a second channel corresponding to the second light-emitting element 120(2).

That is, as a voltage waveform (voltage pulses) corresponding to voltage level V1 of the power V corresponding to the first channel shown in FIG. 3, during a period of times T1 to T2 (duration DT1), the voltage level V1 (voltage level provided to the first light-emitting element 120(1)) is at low level (e.g., 0 Voltage), and the first light-emitting element 120(1) does not emit light; during a period of times T2 to T3, the voltage level V1 is at high level, and the first light-emitting element 120(1) emits light; during a period of times T3 to T4 (duration DT3), the voltage level V1 is changed periodically between the high level and the low level, and the first light-emitting element 120(1) emits light periodically (periodically flashes). The duration of the voltage level V1 at the high level may be considered as a duration DT2 (i.e., a period of times T2 to T4). In another embodiment, the voltage level V1 may be maintained at a high level during a period of times T3 to T4, and the time during which the first light-emitting device 120(1) emits light continuously is the duration DT2.

On the other hand, as a voltage waveform corresponding to the voltage level V2 of the power V corresponding to the second channel shown in FIG. 3, during a period of times T1 to T2 (duration DT1), the voltage level V2 (voltage level provided to the second light-emitting element 120(2)) is at high level, and the second light-emitting element 120(2) emits light; during a period of times T2 to T4 (duration DT2), the voltage level V2 is at low level, and the second light-emitting element 120(2) does not emit light.

During the period of times T1 to T2 (duration DT1), the power management circuit 140 determines that an enabled channel which is currently receiving the power V is the second channel, and determines that current signal type is the second type; during the period of times T2 to T3, the power management circuit 140 determines that the enabled channel which is currently receiving the power V is the first channel, and determines that current signal type is the first type.

When the power management circuit 140 determines that the enabled channel which is currently receiving the power V is maintained as the first channel, but the power V is changed periodically between the high level and the low level, the power management circuit 140 determines that current signal type of the power V is the third type. According to the embodiment shown in FIG. 3, the signal type is the third type during the period of times T3 to T4 (duration DT3).

If the current signal type is the first type or the third type, the first light-emitting element 120(1) emits light continuously or flashing periodically, and indicates corresponding passage is (under) a first passing state; if the current signal type is the second type, the second light-emitting element 120(2) emits light continuously, and indicates corresponding passage is (under) a second passing state. In the embodiment, the first passing state is, for example, an allowable-passing state, and the light emitted by the first light-emitting element 120(1) is, for example, a constant green light or a flashing green light, which is for indicating the corresponding passage is allowable for passing through; the second passing state is, for example, an forbidden-passing state, and the light emitted by the second light-emitting element 120(2) is, for example, a constant red light, which is for indicating the corresponding passage is forbidden for passing through.

It should be noted that the duration/pattern provided by the power V to each channel may be cyclical, for example, the pattern of the power V of the second cycle and the third cycle is the same as the first cycle. As the power V is cyclically supplied to the first channel and the second channel, the lamp 10 may cyclically (periodically) emits different lights to indicate whether the corresponding passage is allowable for passing through.

Back to FIG. 2, in the step S22, the processor 110 sets the currently identified signal type as a current signal type, and starts to continuously accumulate a duration corresponding to the current signal type. Specifically, the processor 110 identifies signal type of the power at current moment is the first type, the second type or the third type via the power management circuit 140, and sets "the current signal type" as the identified first type, second type or the third type accordingly. It should be noted that the power management circuit 140 identifies signal type of the power V continuously when the power V is received, and the power management circuit 140 sends the identified result to the processor 110, such that the processor 110 may continuously knows/sets the current signal type.

In the embodiment, when the processor 110 determines that the current signal type is changed to other signal types, for example, the current signal type changes from the second type to the first type, from the first type to the third type, or from the third type to the second type, the processor 110 starts to accumulate a duration corresponding to the current signal type. In other words, the processor 110 continuously records the length of the duration of each type of the current signal types.

Taking FIG. 3 as an example, at time T1, the power management circuit 140 recognizes that the signal type of the power V is the second type, the processor 110 sets the current signal type as the second type, and starts to accumulate a duration of the second type. Until the time T2, the power management circuit 140 recognizes that the signal type of the power V is changed to the first type, the processor 110 stops accumulating the duration corresponding to the second type and obtains the duration corresponding to the second type as DT1 (T2-T1). Then, the processor 110 starts to accumulate a duration corresponding to the first type till time T3. At this time, the power management circuit 140 recognizes that the signal type of the power V is changed to the third type, and the processor 110 stops accumulating the duration corresponding to the first type and obtains the duration corresponding to the first type as (T3-T2). Subsequently, the processor 110 may start to accumulate a duration corresponding to the third type till the time T4 when the power management circuit 140 recognizes that the signal type has been changed from the third type to the second type, and the duration corresponding to the third type is obtained as DT3 (T4-T3).

In the step S23, the processor 110 determines whether the current signal type is changed. As mentioned above, the processor 110 may determine whether the current signal type is changed according to current enabled channel and power V which are identified by the power management circuit 140.

When the current signal type is determined as changed, in the embodiment, in the step S24, the processor 110 stops accumulating the duration, and recording the accumulated duration as a total duration corresponding to the current signal type. Specifically, if the current signal type is changed, the processor 110 may stop the accumulation of the duration corresponding to the current signal type which is before the changing, and record the accumulated duration as a total duration corresponding to the current signal type before the changing. The processor 110 may store the information of the total duration in a buffer or other suitable storage device (e.g., non-volatile memory module, etc.). Next, continue to step S22, the processor 110 may set the changed signal type as a "new" current signal type, and re-accumulate a duration corresponding to this new current signal type.

In the step S23, when the current signal type is determined as unchanged, continue to step S25, the processor 110 calculates a remaining duration corresponding to the current signal type according to the total duration and the accumulated duration corresponding to the current signal type. Specifically, the processor 110 may read the total duration corresponding to the current signal type (for example, read a total duration corresponding to first type which is the type of the current signal type), and minus the read total duration by a currently accumulated duration corresponding to the current signal type to obtain a difference, and treat this obtained difference as a remaining duration corresponding to the current signal type.

For example, assuming that the read total duration corresponding to the first type which is the type of the current signal type is 30 seconds, and currently accumulated duration corresponding to the first type (the current signal type is first type) is 5 seconds. At this moment, the processor 110 may obtain a remaining duration "25 seconds" (30-5 seconds) corresponding to the first type. Namely, the processor 110 may know how long time (remaining duration) the power V maintains as the first type according to the recorded total duration corresponding to the first type (current signal type) and the currently accumulated duration corresponding to the first type (current signal type).

Next, in the step S26, the processor 110 pushes information corresponding to the current signal type, wherein the information includes a passing state and the remaining duration corresponding to the current signal type. Specifically, the processor 110 identifies a passing state according to the current signal type, and, after calculating the remaining duration corresponding to the current signal type, the processor 110 may push (send/broadcast) the passing state and the remaining duration corresponding to the current signal type (information corresponding to the current signal type) to nearby electronic device 20 via the wireless communication module 130. In the embodiment, the processor 110 may push the information in units of one second. That is, the processor 110 instructs the wireless communication module 130 to push the generated information having the passing state and the remaining duration at every second.

Next, back to the step S23, the processor 110 continues to determine whether the current signal type is changed, and continuously accumulates corresponding duration and calculates the corresponding remaining duration.

In another embodiment, when setting the current signal type (after step S21), the processor 110 may first determine whether the corresponding total duration has been recorded. If so, the processor 110 begins to count down the total duration every one second to obtain the remaining duration. The processor 110 will push the passing state and the obtained remaining duration corresponding to the current signal type via the wireless communication module 130. In another embodiment, if it is determined that the corresponding total duration is not recorded, the processor 110 starts to accumulate the corresponding duration to obtain and record the total duration corresponding to the current signal type till the timepoint that the current signal type is changed.

The operation flow of electronic device receiving the pushed information will be described in detail below by FIG. 4.

Figure 4:
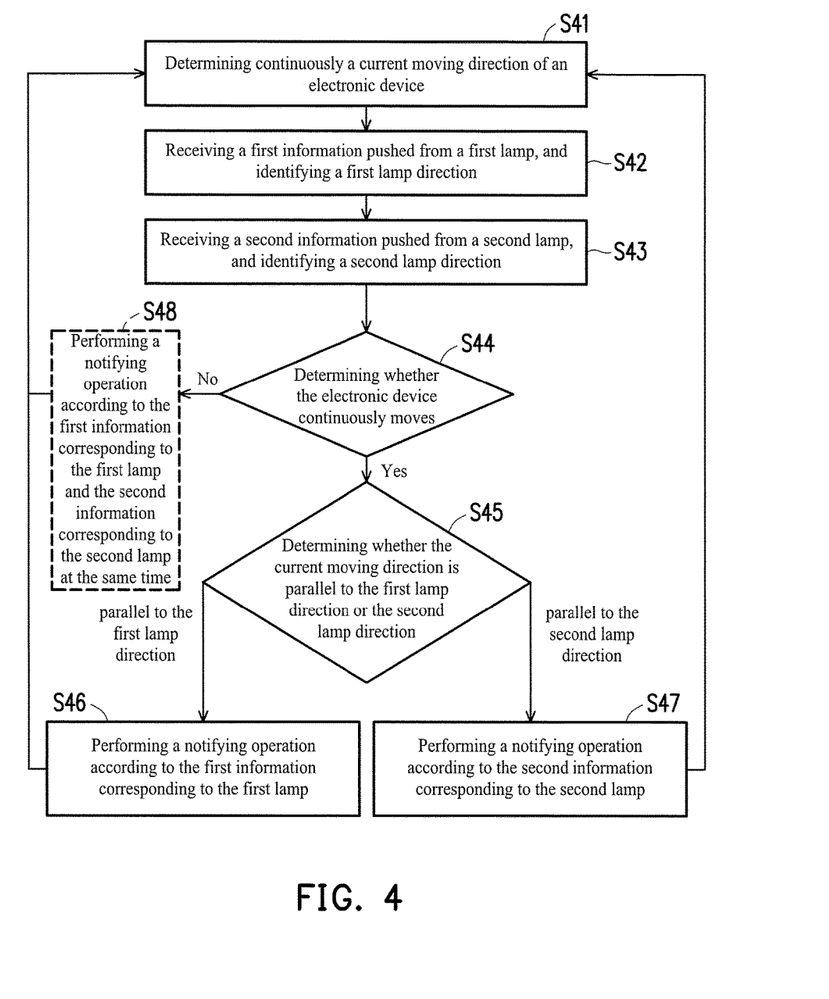
FIG. 4 is a flowchart illustrating an operation of an electronic device performing a notifying operation according to received information according to an embodiment of the invention.
Figure 5:
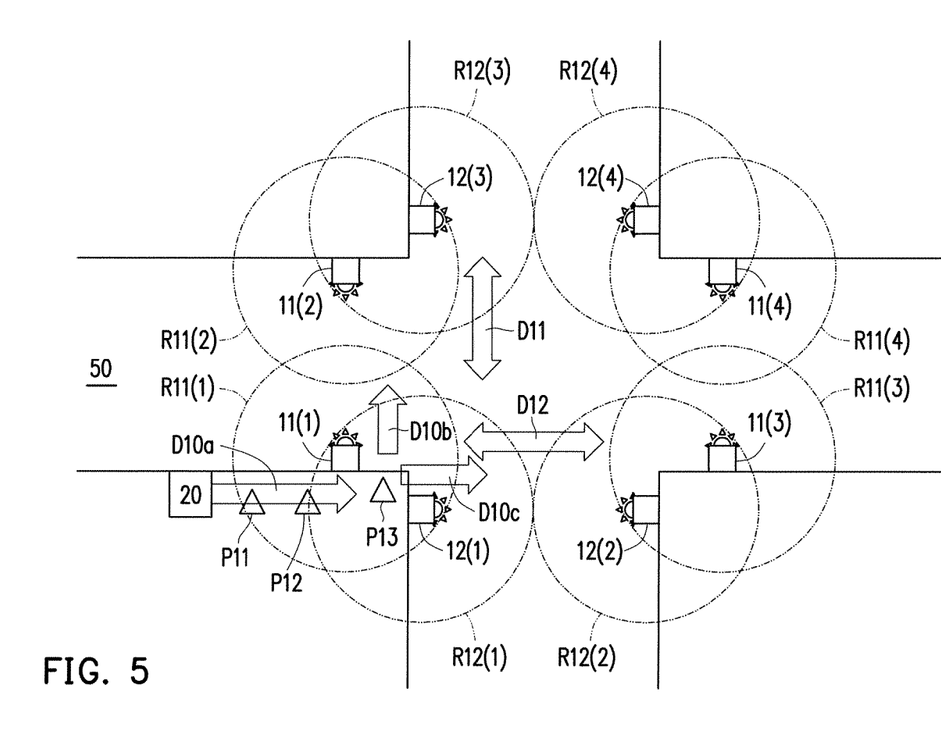
FIG. 5 is an aerial view schematic diagram illustrating determining whether a moving direction of an electronic device is parallel to lamp direction corresponding to the received information.

FIG. 4 is a flowchart illustrating an operation of an electronic device performing a notifying operation according to received information according to an embodiment of the invention. FIG. 5 is an aerial view schematic diagram illustrating determining whether a moving direction of an electronic device is parallel to lamp direction corresponding to the received information.

Referring to FIG. 4, in the step S41, the processor 210 continuously determines a current moving direction of an electronic device 20.

For example, referring to FIG. 5, it is assumed that two sets of lamps 11(1) to 11(4) and 12(1) to 12(4) are disposed on the intersection of the roads 50, wherein information pushed by lamps 11(1) to 11(4) are the same, and information pushed by lamps 12(1) to 12(4) are the same. The ranges for the lamps 11(1) to 11(4) to push the information are respectively the pushing range R11(1) to R11(4), and the ranges for the lamps 12(1) to 12(4) to push the information are respectively the pushing range R12(1) to R12(4). For example, the pushing range R11(1) is a circular pushing range of Beacon (iBeacon) matching the Bluetooth 4.0 protocol which is drawn/set around the lamp 11(1) (lamp 11(1) is as the center of the pushing range), that is, an electronic device in the pushing range R11(1) can receive the information pushed by the lamp 11(1).

A lamp direction corresponding to the lamps 11(1) to 11(4) is a lamp direction D11, and a lamp direction corresponding to the lamps 12(1) to 12(4) is a lamp direction D12. The lamp direction is used for indicating a direction of a passage which is indicated by the corresponding lamp. For example, the lamp direction D11 indicates a passage direction between the side of the road from the lamp 11(1) and the side of the road of the lamp 11(2), and it (D11) may also be a passage direction between the sides of road of the lamp 11(3) and the lamp 11(4). For another example, the lamp direction D12 indicates a passage direction between the side of the road from the lamp 12(1) and the side of the road of the lamp 12(2), and it (D12) may also be a passage direction between the sides of road of the lamp 12(3) and the lamp 12(4).

In this example, the processor 210 continuously determines, according to the location information of the electronic device 20 detected by the global positioning device 220, the location change of the electronic device 20 in the background, and further identifies the traveling direction (moving direction of the electronic device 20) as D10a. In addition, the moving direction and the lamp direction can be expressed by using azimuth, and is not limited thereto.

Next, in the step S42, the processor 210 receives a first information pushed from a first lamp 11(1) via the wireless communication module 230, and identifies a first lamp direction D11. For example, when the electronic device 20 passes the position P11, the electronic device 20 is entering the pushing range R11(1) and starts to receive the first information pushed by the first lamp 11(1). Since the first lamp 11(1) is located closer (comparing to the second lamp 12(1)) to the electronic device 20, the processor 210 recognizes that the first lamp direction D11 is perpendicular to the moving direction D10a.

Next, if the electronic device 20 continuously moves forward along the moving direction D10a, in the step S43, the processor 210 receives a second information pushed from the second lamp 12(1) via the wireless communication module 230, and identifies a second lamp direction D12. For example, when the electronic device 20 passes the position P12, the electronic device 20 is entering the pushing range R12(1) and starts to receive the second information pushed by the second lamp 12(1). The processor 210 recognizes that the second lamp direction D12 is parallel to the moving direction D10a. At this moment, since the electronic device 20 is within the pushing range R11(1), the electronic device 20 continuously receives the pushed first information.

Next, in the step S44, the processor 210 determines whether the electronic device 20 continuously moves.

Specifically, after receiving the first information and the second information, the processor 210 may continuously determine whether the electronic device 20 is moving continuously. If the determination is yes, in step S45, the processor 210 determines whether the current moving direction is parallel to the first lamp direction D11 or the second lamp direction D12. Specifically, the processor 210 determines whether the currently identified moving direction is parallel to the first lamp direction D11 or the second lamp direction D12 set before. For example, if the current moving direction is the moving direction D10b, the processor 210 determines that the current moving direction is parallel to the first lamp direction D11. If the current moving direction is the moving direction D10c, the processor 210 determines that the current moving direction is parallel to the second lamp direction D12.

In another embodiment, after the processor 210 receives the pushed information of the first lamp 11(1) and the second lamp 12(1), the processor 210 determines a relationship between the current identified moving direction (also referred to as the third moving direction) and a first moving direction or a relationship of the third moving direction and a second moving direction, wherein the first moving direction is the first lamp direction D11 and the second moving direction is the second lamp direction D12. For example, if the third moving direction is changed from D10a to D10b, the processor 210 determines the currently identified third moving direction is parallel to the first lamp direction D11 and vertical to the second lamp direction D12. If the third moving direction is from D10a to D10c, the processor 210 determines the currently identified third moving direction is parallel to the second lamp direction D12 and vertical to the first lamp direction D11.

In step S45, when the third moving direction (currently identified moving direction of the electronic device 20) is determined as being parallel to the first lamp direction D11, continue to step S46, the processor 210 performs a notifying operation according to the first information of the first lamp 11(1); when the third moving direction (currently identified moving direction of the electronic device 20) is determined as being parallel to the second lamp direction D12, continue to step S47, the processor 210 performs a notifying operation according to the second information of the second lamp 12(1).

That is, if it is determined that the current moving direction is parallel to the first lamp direction D11, the processor 210 determines that the electronic device 20 will pass through a passage between the first lamp 11(1) to the first lamp 11(2), and then the processor 210 uses the first information pushed by the first lamp 11(1) to perform a prompt operation (also called as the notifying operation). If it is determined that the current moving direction is parallel to the second lamp direction D12, the processor 210 determines that the electronic device 20 will pass through a passage between the second lamp 12(1) to the second lamp 12(2), and further uses the second information pushed by the second lamp 12(1) to perform a notifying operation. Next, the operation flow returns to the step S41. That is, the electronic device 20 determines the current moving direction and continuously receives the information pushed by the lamp 10, and determines the pushed information should be referred based on determining whether the current moving direction of the electronic device 20 is parallel to a certain lamp direction.

In addition, if the processor 210 receives information pushed by a third lamp, and the content of this information is the same as the content of the information being used by the electronic device 20 currently, the processor 210 treats the information pushed by the third lamp as a new second information, and sets the third lamp as a new second lamp. Then, a following new and different received information (pushed by a fourth lamp) would be treated as a new first information, and the fourth lamp that pushes the new first information would be set as a new first lamp. For example, if the moving direction is the first moving direction D11, when the electronic device 20 enters the pushing range R11(2) from the pushing range R11(1) and starts to receive information pushed by a third lamp 11(2), since the information pushed by the third lamp 11(2) is the same as the information pushed by the first lamp 11(1), the information pushed by the third lamp 11(2) would be treated as a new second information, and the third lamp 11(2) would be set as a new second lamp 11(2). Then the electronic device 20 keeps moving forward, when the electronic device 20 enters the pushing range R12(3) and starts to receive the information (different to the currently used information) pushed by the fourth lamp 12(3), this information will be regarded as a new first information, the fourth lamp 12(3) would be set as the new first lamp, and so on. As described above, the received first information or second information may include the passing state and the corresponding remaining duration corresponding to the first lamp 11(1) or the second lamp 12(1). Assuming that the processor 210 performs the notifying operation according to the first information, the processor 210 first identifies the passing state and the corresponding remaining duration of the received first information. If the passing state is the allowable-passing state (the first passing state), the processor 210 counts down the remaining duration corresponding to the allowable-passing state, and the processor 210 generates a sound signal or an image signal to indicate (prompt) the remaining duration being counted down. For example, the processor 210 may generate a sound signal to make a sound through the speaker of the electronic device 20, and the sound corresponds to the current passing state and the current remaining duration being counted down. For example, the speaker of the electronic device 20 may make a voice like "twenty seconds left for passing through" to indicate that the current passing state of the passage is the allowable-passing state and the remaining duration of the allowable-passing state is twenty seconds. Or, the processor 210 can generate an image signal to display an image through the screen of the electronic device 20, and the image corresponds to the current passing state and the current remaining duration being counted down. For example, the screen of the electronic device 20 will display a green number "20" to indicate that the current passing state of the passage is the allowable-passing state and the remaining duration of the allowable-passing state is twenty seconds. Along with the counting down of the remaining duration, the remaining duration would be reflected via the voice/image played/displayed by the electronic device 20.

In addition, if the passing state is the forbidden-passing state, the processor 210 instructs the electronic device 20 to issue a notification sound or vibration, the processor 210 counts down the remaining duration corresponding to the forbidden-passing state, and the processor 210 generates another sound signal or another image signal to indicate the remaining duration being counted down. Different from the foregoing example of allowable-passing state, the processor 210 may generate a beep sound (waring sound) or prompt vibration when the passing state is forbidden-passing state, so as to more clearly remind that a current passage the electronic device 20 is about to pass through is forbidden.

For example, when the passing state is identified as the forbidden-passing state, the electronic device 20 may first make a vibration. Next, the speaker of the electronic device 20 generates a voice "passing is forbidden for twenty seconds" to indicate current forbidden-passing state and there are still twenty seconds remaining in the current forbidden-passing state. Or, the red number "20" is displayed on the screen of the electronic device 20 to indicate current forbidden-passing state and there are still twenty seconds remaining in the current forbidden-passing state.

In an embodiment, the processor 210 may also cause the electronic device 20 to send out another beep sound or vibration when the passing state is changed.

If, in the step S44, the processor 210 determines that the electronic device 20 does not move continuously, in the step S48, the processor may perform the notifying operation according to both the first information corresponding to the first lamp 11(1) and the second information corresponding to the second lamp 12(1) at the same time. For example, when the electronic device 20 stops at the position P13, the processor 210 determines that the electronic device 20 is not moving continuously (is not keeping moving), and then, the processor 210 make the screen of the electronic device 20 displays different passing states and remaining times respectively corresponding to different lamp direction at the same time (may displayed on different location of the screen). Furthermore, the corresponding lamp direction may be displayed on the screen.

Based on the above, lamp, electronic device and passing information pushing system provided by the embodiment of the present invention, are capable of letting the traffic lights or lamps having similar function determine passing state of corresponding passage by using signal type of the current received power, and obtaining total durations and remaining durations respectively corresponding to different passing states, and then proactively pushing information including the passing states and corresponding remaining durations of the corresponding passage to nearby electronic devices. Such that an electronic devices receiving the pushed information may perform, based on determining whether current moving direction of the electronic device is parallel to lamp direction corresponding to the received information, a notifying operation to indicate current passing state and remaining duration corresponding to the passing state for a passage through which the electronic device is about to pass. Therefore, even when a lamp displays abnormally (e.g., parts of light-emitting elements thereof are broken), the provided system may still provide pedestrian correct passing state of the passage which is about to be passed through by the pedestrian, so as to reduce traffic accident.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A lamp capable of pushing information, comprising:
a power management circuit, configured to receive a power and identify a signal type of the power,
a light-emitting module, configured to emit light or flash according to the received power;
a wireless communication module; and
a processor, coupled to the light-emitting module, the power management circuit and the wireless communication module,
wherein the processor is configured to treat the current identified signal type of the power as a current signal type, and start to continuously accumulate a duration corresponding to the current signal type,
wherein the processor is further configured to determine whether the current signal type is changed, wherein when the current signal type is changed, the processor is further configured to stop accumulating the duration, and record the accumulated duration as a total duration corresponding to the current signal type,
wherein when the current signal type is not changed, the processor is further configured to calculate, according to the total duration and currently accumulated duration, a remaining duration corresponding to the current signal type, and the processor is further configured to instruct the wireless communication module to push the information corresponding to the current signal type, wherein the information comprises a passing state and the remaining duration corresponding to the current signal type.

2. The lamp according to claim 1, wherein the power management circuit provides the power through one of a plurality of channels respectively corresponding to a plurality of light-emitting elements of the light-emitting module, wherein the light-emitting elements comprises a first light-emitting element and a second light-emitting element, the signal type comprises a first type and a third type corresponding to the first light-emitting element; and a second type corresponding to the second light-emitting element, and the channels comprise a first channel corresponding to the first light-emitting element; and a second channel corresponding to the second light-emitting element, wherein the operation of the power management circuit identifies the received signal type of the power,
the power management circuit identifies whether the signal type is the first type, the third type or the second type by determining the power and by determining whether an enabled channel for receiving the power among the channels is the first channel or the second channel.

3. The lamp according to claim 2, wherein the lamp is disposed on a passage, wherein the first type and the third type correspond to an allowable-passing state, and the first light-emitting element emitting light or flashing is configured to indicate that the passage is allowable for passing through,
wherein the second type corresponds a forbidden-passing state, and the second light-emitting element is configured to indicate that the passage is forbidden for passing through.

4. The lamp according to claim 2, the operation of the processor is further configured to determine whether the current signal type is changed,
when the enabled channel is changed from the first channel to the second channel, or from the second channel to the first channel, or when the enabled channel is maintained as the first channel but a voltage level of the power starts to change periodically between a high level and a low level, the processor determines that the current signal type is changed.

5. An electronic device, comprising: a global positioning device, configured to detect position information of the electronic device; a wireless communication module, configured to receive information being pushed; and a processor, coupled to the global positioning device and the wireless communication module, wherein the processor is configured to continuously determine a moving direction of the electronic device via the position information of the electronic device, wherein the processor receives first information pushed by a first lamp through the wireless communication module, and identifies a first lamp direction, wherein the processor receives second information pushed by a second lamp through the wireless communication module, and identifies a second lamp direction, wherein the processor is further configured to determine whether the electronic device is continuously moving, wherein when the electronic device is continuously moving, the processor determines whether the current moving direction is parallel to the first lamp direction or the second lamp direction, wherein when the current moving direction is parallel to the first lamp direction, the processor performs a notifying operation according to the first information corresponding to the first lamp, wherein when the current moving direction is parallel to the second lamp direction, the processor performs a notifying operation according to the second information corresponding to the second lamp.

6. The electronic device according to claim 5, wherein when the electronic device is not continuously moving, the processor performs a notifying operation according to both the first information corresponding to the first lamp and the second information corresponding to the second lamp.

7. The electronic device according to claim 5, wherein when the content of received information pushed by a third lamp is the same as the content of the information being used currently, the processor treats the information pushed by the third lamp as a new second information, and sets the third lamp pushing the information as a new second lamp,
and then when the processor receives a pushing information different to the new second information, the pushing information is treated as a new first information, and a fourth lamp for pushing the new first information is set as a new first lamp.

8. The electronic device according to claim 5, wherein the operation of the processor determines whether the current moving direction is parallel to the first lamp direction or the second lamp direction,
when first receiving the first information, the processor sets the first lamp direction to be perpendicular to a currently identified first moving direction of the electronic device,
when first receiving the second information after receiving the first information, the processor sets the second lamp direction to be parallel to a currently identified second moving direction of the electronic device,
wherein the processor determines a relationship between a currently identified third moving direction and the first moving direction, and a relationship between the third moving direction and the second moving direction, wherein when the third moving direction is parallel to the first moving direction and perpendicular to the second moving direction, the processor determines that the third moving direction is parallel to the first lamp direction, wherein when the third moving direction is perpendicular to the first moving direction and parallel to the second moving direction, the processor determines that the third moving direction is parallel to the second lamp direction.

9. The electronic device according to claim 5, wherein the first information and the second information respectively comprise passing state and remaining duration corresponding to the first lamp and the second lamp, wherein in the performed notifying operation:
  if the passing sate is an allowable-passing state, the processor counts down the remaining duration corresponding to the allowable-passing state, and the processor generates a sound signal or an image signal to indicate the remaining duration which is being counted down,
  if the passing sate is a forbidden-passing state, the processor counts down the remaining duration corresponding to the forbidden-passing state, and the processor generates another sound signal or another image signal to indicate the remaining duration which is being counted down.

10. A passing information pushing system, comprising:
  a plurality of lamps, each of the lamps emits light according to received power, so as to indicate whether corresponding passage is allowable for passing through via the emitted light therefrom; and
  an electronic device,
  wherein each of the lamps identifies a signal type of the power,
  when the signal type of the power is a first type or a third type, light emitted by each of the lamps receiving the power is for indicating that the corresponding passage is allowable for passing through,
  when the signal type of the power is a second type, light emitted, by each of the lamps receiving the power is for indicating that the corresponding passage is forbidden for passing through,
  wherein each of the lamps treats the currently identified signal type of the power as a current signal type, and starts to continuously accumulate a duration corresponding to the current signal type,
  wherein each of the lamps calculates, according to a total duration and currently accumulated duration corresponding to the current signal type, a remaining duration corresponding to the current signal type, and each of the lamps is further configured to push information corresponding to the current signal type, wherein the information comprises a passing state and the remaining duration corresponding to the current signal type,
  wherein the electronic device continuously determines a current moving direction of the electronic device,
  wherein the electronic device receives a first information pushed by a first lamp among the lamps, and identifies a first lamp direction,
  wherein the electronic device receives a second information pushed by a second lamp among the lamps, and identifies a second lamp direction,
  wherein the electronic device performs a notifying operation according to the first information corresponding to the first lamp or the second information corresponding to the second lamp by determining whether the current moving direction is parallel to the first lamp direction or the second lamp direction, so as to indicate the passing state and the remaining duration corresponding to the first lamp or the second lamp.

11. The passing information pushing system according to claim 10,
  wherein the lamp is further configured to determine whether the current signal type is changed,
  wherein when the current signal type is changed, the lamp stops accumulating the duration, and records the accumulated duration as the total duration corresponding to the current signal type,
  wherein when the current signal type is not changed, the lamp minuses the total duration corresponding to the current signal type by the currently accumulated duration to obtain a difference as the remaining duration corresponding to the current signal type.

* * * * *